United States Patent [19]
Burgess

[11] Patent Number: 6,111,861
[45] Date of Patent: Aug. 29, 2000

[54] METHOD AND SYSTEM FOR MANAGING HIGH SPEED DATA COMMUNICATION

[75] Inventor: Scott M. Burgess, Lake Worth, Fla.

[73] Assignee: Siemens Information and Communication Networks, Inc., Boca Raton, Fla.

[21] Appl. No.: 08/774,343

[22] Filed: Dec. 30, 1996

[51] Int. Cl.[7] .............................. H04B 3/20; H04M 9/02
[52] U.S. Cl. ......................... 370/286; 370/287; 379/402
[58] Field of Search ................................ 370/285, 286, 370/287, 290, 291, 292; 379/410, 411, 403, 406

[56] References Cited

U.S. PATENT DOCUMENTS

| | | | |
|---|---|---|---|
| 4,742,540 | 5/1988 | Schingh | 379/403 |
| 4,757,527 | 7/1988 | Beniston et al. | 379/410 |
| 5,014,306 | 5/1991 | Rodgers et al. | 379/406 |

*Primary Examiner*—Chi H. Pham
*Assistant Examiner*—Maikhanh Tran
*Attorney, Agent, or Firm*—Joseph S. Codispoti

[57] ABSTRACT

A method and device for managing the communication of high speed analog data across a communications line. If the communications line is not authorized for communication of high speed analog data, line conditioning applied (e.g., at a digital line unit or subscriber line interface circuit) to the communications line is varied. The line conditioning may include echo suppression and/or hybrid balancing. If the line conditioning unit is a digital signal processor, the line conditioning is varied by varying coefficients or line types. If the line conditioning unit is a circuit, the line conditioning is varied by varying a control signal to a selection element of the analog circuit.

18 Claims, 9 Drawing Sheets

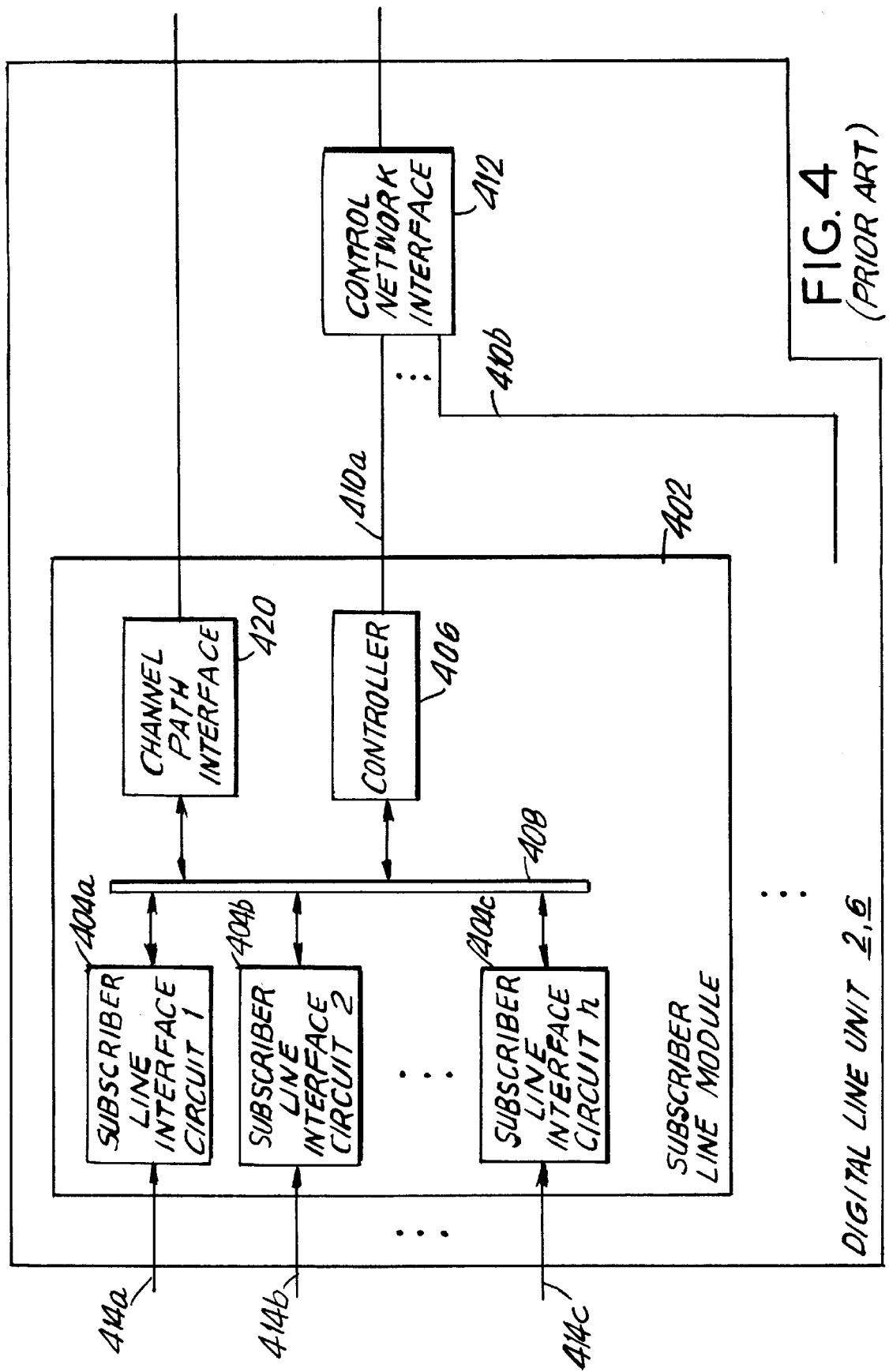

METHOD AND SYSTEM FOR MANAGING HIGH SPEED DATA COMMUNICATION

TECHNICAL FIELD

The invention relates generally to managing high speed data communications, such as high speed modem access of the Internet. More particularly, the invention relates to selectively inhibiting high speed data calls over narrow bandwidth lines (or facilities).

BACKGROUND

§1.0 Overview of the Telephone System

The station equipment and transmission facilities used by regional Bell operating companies (or "RBOCs") and other telephone service providers are well-known. FIG. 6 is a block diagram which illustrates the use of transmission facilities by various types of telecommunication services. As shown in FIG. 6, a number of geographically remote central switching offices 620a, 620b are coupled via "trunks" 614 and interoffice transmission facilities 618. Various entities, such as residences 602a, 602b, businesses 604a, 604b, and private branch exchanges (or "PBXs") 606a, 606b are coupled with a central switching office 620a, 620b via "lines" 610, 612 and "loop transmission facilities" 608.

Thus, a loop transmission facility (or "subscriber loop") 608 connects telecommunication equipment at a customer premises (e.g., a residence, business, etc.) with an associated central switching office 620a, 620b. The loop transmission facility 608 is typically on the order of a few miles and usually includes paired copper wire (also referred to as "twisted pair"). Such twist pair transmission facilities were originally installed for carrying analog voice signals. Conditioned two wire, as well as four wire (or two-twisted pair), transmission facilities are being installed for providing digital voice and data services such as Integrated Digital Services Network (or "ISDN") services. Interoffice transmission facilities 618, or trunks, connect different central switching offices 620a, 620b. Interoffice transmission facilities 618 range from less than one mile to thousands of miles.

§1.1 Overview of a Central Office Switch

§1.1.1 High Level

FIG. 1a is a high level block diagram of equipment which is typically used at a switching office (or "central office") 620. Lines 4 (such as twisted-pairs of the loop transmission facility 608 for example), carrying analog signals (such as signals from telephones or modems for example), are terminated at a subscriber line interface circuit (or "SLIC") (not shown) of an analog subscriber line module (not shown) of a digital line unit 2, 6. Digital signals are terminated at digital subscriber line modules (not shown) of a digital line unit 2, 6.

Lines 14 and 16 (e.g., T1 links carrying up to 1.544 Mbps, which can handle at least 23–64 Kbps voice channels) from the digital line units 2, 6, are provided to a switch interface module 12. In addition, a digital trunk(s) 10 may be provided to a switch interface module 12. The switch interface module 12 interfaces the lines (e.g., 14, 16, and 10) to a switching network 20. For example, in a 5ESS™ switch (sold by Lucent Technologies—formerly part of AT&T) each of the switch interface modules includes a time slot exchange which re-orders the time slots of incoming time multiplexed channels based on transfer logic. Each interface module provides, via two optical fiber links, 512 time division multiplexed channels to a time multiplexed switch.

The switching network 20 provides a connection between a caller and a called line. In the 5ESS™ switch, the switching network includes a time multiplexed switch that can be thought of as a cross bar switch having cross connected states which change with changing time slots.

§1.1.2 Digital Line Units

As shown in FIG. 4, each of the digital line units 2,6 includes one or more subscriber line modules 402. The subscriber line module(s) 402 may be (a) analog subscriber line module(s) and/or (b) digital subscriber line modules(s). Analog subscriber line modules are used to terminate lines provisioned for analog (e.g., voice) services. Digital subscriber line modules are used to terminate lines provisioned for digital (e.g., ISDN) services. For purposes of understanding the invention, only analog subscriber line modules will be described.

Each of the subscriber line modules 402 includes one or more (e.g., 4, 8, or 16) SLICs 404 which share a common bus systems 408 and are controlled by controller 406. The controller 406 may be a microprocessor executing stored instructions. The channel path interface 420 establishes connections between the subscriber line interface circuits and the switch interface module. Assuming that the subscriber line interface circuits 404 are part of an analog subscriber line module 402, basically, each subscriber line interface circuit 404 functions to (i) terminate a single wire pair, duplex, line 414, (ii) provide line conditioning and signal processing, and (iii) convert the analog signal to a digital signal. The structure and operation of a subscriber line interface circuit 404 will be discussed in greater detail below.

§1.1.2.1 Hybrid Transformers

Referring back to FIG. 1a, most of the lines 4,8 terminating at the digital line units 2, 6 are single copper pair (or twisted pair), full duplex (i.e., two way), facilities. However, at the central office, two unidirectional copper pairs (as well as optical fiber) facilities are used—one copper pair for each direction. Thus, as shown in FIG. 2a, a two wire to four wire converter 202 is needed to pass convert signals from a duplex (two-way) copper pair 204 to two unidirectional copper pairs 206. Such a conversion is typically accomplished with a hybrid transformer. FIG. 2b is a schematic of a hybrid transformer 202 in which $Z_d$ represents the impedance of the duplex copper pair 204, $Z_b$ represents the impedance of unidirectional copper pair 206b which is amplified by amplifier(s) 210, and $Z_a$ represents the impedance of unidirectional copper pair 206a which is amplified by amplifier(s) 208. The impedance $Z_c$ represents a balancing impedance needed to reduce or eliminate unwanted echo resulting from imperfections in the hybrid transformer.

§1.1.2.2 Problem of Echo

FIGS. 3a through 3c are schematics of a system using hybrid transformers which illustrate transmission of the original voice signal, "talker echo", "listener echo", respectively. Hybrid transformers are a frequent source of echo because, although the impedances $Z_a$ and $Z_b$ of the four wire circuit are typically fixed, and under design control, the impedance $Z_d$ of the two wire circuit, and hence the impedance $Z_c$ of the balancing network are not always under design control. This is because the two wire circuit is often not a dedicated circuit.

Referring to FIG. 3a, a voice signal 314 from a caller is carried on duplex wire pair 304. The hybrid transformer 302a applies this signal to unidirectional wire pair 306a, which is amplified by amplifiers 308, and ultimately (e.g., after passing through a central office switching network) reaches the hybrid transformer 302b. The hybrid transformer 302b applies the signal to the duplex wire pair 312.

FIG. 3b illustrates talker echo 316. Due to imperfections of the hybrid transformer 302b, part of the signal is reflected back to the talker via unidirectional wire pair 306b. This reflected signal is amplified by amplifiers 310. Consequently, the talker will hear their own voice, delayed by the total delay of the echo path. The reflected signal may have sufficient amplitude and delay to annoy the talker and interfere with their speech process.

FIG. 3c illustrates listener echo 318. Due to imperfections of the hybrid transformer 302a, part of the echo signal 316 is reflected back to the listener via unidirectional wire pair 306a. Thus, the speech signal representing the talker's voice is heard twice by the listener. For short echo delays, this impairment causes the listener to perceive a hollowness in the talker's speech. Naturally, provisions to control talker echo will also control listener echo.

Finally, "singing" noise can be caused by circulating power in the transmission path and can manifest itself as a sustained loud tone on the connection. Singing occurs if the gains in the line amplifiers (or repeaters) 308, 310 are high enough so that, at some frequency, the round trip path gain is greater than one.

In addition to causing problems with voice communication, echo can cause similar problems with data communication. Listener echo, in particular, is troublesome. For example, if data signaling rates of between 1 and 10 Kbps are used, listener echo, delayed by 0.1 to 1.0 ms or more appears at the receiver as an unwanted interfering signal having relatively little correlation with the original signal. If the magnitude of this interference is high enough, it may constitute a serious source of data errors.

§1.1.2.3 Echo Cancellation

Most digital line units include circuitry, such as digital signal processors, for canceling echo. Such circuitry may be referred to as automatic hybrid balancing means or echo cancellation means. Auto hybrid balancing and echo cancellation are subsets of line conditioning. Line conditioning may include auto hybrid balancing, echo suppression, limiting alteration distortion, envelop-delay distortion, impulse noise, frequency shift, phase jitter, phase hits, gain hits, dropout, and/or increasing the signal-to-noise ratio. For example, in the EWSD® switch, sold by Siemens Stromberg-Carlson, subscriber line modules at digital line units may provide automatic hybrid balancing and select an appropriate type of balance network at the time of call setup. Selection may be based on information stored in the EWSD® switch data base for each subscriber line. More specifically, the EWSD® switch provides the following types of balancing networks for various types of lines (or loops). In a non-loaded loop, a balancing network, including an 800 Ω resistor in parallel with a series connected 0.05 µF capacitor and 100 Ω resistor for example, may be provided. In a loaded loop, a balancing network, including a 1650 Ω resistor in parallel with a series connected 0.005 µF capacitor and 100 Ω resistor for example, may be provided. In a special service loop, a balancing network, including a 900 Ω in series with a 2.16 µF capacitor for example, may be provided. Finally, in an optimized loop, filter coefficients for the digital signal processor are automatically selected to simulate the most appropriate balance network for the link. Other classifications of line types and corresponding balancing networks are possible.

§1.2 Example of Operation of a Central Office

FIG. 1b is a block diagram of a digital switch, such as an EWSD® switch in which dialing and connection operations are shown. Each of the line trunk groups 108 and 158 includes (i) a digital interface unit 110 or 160, (ii) a group switch (or peripheral switch matrix) 128 or 178, (iii) a link interface unit 130 or 180, (iv) a group processor 112 or 162, (v) a tone generator 126 or 176, and (vi) a code receiver 116 or 166. The digital interface units 110 and 160 adapt incoming T1 carriers from the digital line units 106 and 156, respectively, to internal speech and signaling paths of their line trunk groups 108 and 158, respectively. The group switches 128 and 178 are non-blocking switching stages which interconnect the functional units of their line trunk groups 108 and 158, respectively, via speech paths. The link interface units 130 and 180 transmit speech and data from the group switches 128 and 178, respectively, over a 128 channel carriers to and from switching network(s) 122. The group processors 112 and 162 are microprocessor based units that control all activities of their line trunk groups 108 and 158, respectively. The tone generators 126 and 176 generate dual tone multi-frequency (or "DTMF") and MF-R1 tones for line and trunk signaling. The code receivers 116 and 166 detect the multi-frequency DTMF and MF-R1 tones used for subscriber line and trunk signaling.

In the following example, it is assumed that a line has already been seized by telephone A 102 and a dial tone has been provided, via path 190a, to telephone A 102.

At telephone A 102, the subscriber enters digits by pressing push-buttons of the telephone's keypad. The digital line unit 106 detects the first digit and sends two messages to the group processor 112. The first message, provided to the signaling line control unit 114 via signal path 192, asserts that a digit has been detected. The second message contains signals (or bits) defining the first digit. More specifically, a DTMF generator at the telephone A 102 generates a dual tone in response to the push-button pressed by the subscriber. This dual tone is sent, in-band, via digital I/O unit 110 and group switch 128, to code receiver 116. The code receiver 116 decodes the dual tone, in-band, signal and provides the decoded value to the processor module unit 118 via signal path 194.

Subsequent digits are similarly provided to the processor module unit 118. Once the processor module unit 118 determines that the digits are sufficient for interpretation, it sends the digits, via signal path 196, to the central processor 120. The central processor 120 queries an appropriate data base to determine port assignments for the line trunk group 158 and digital line unit 156 of telephone B 104. The port assignments are then marked busy and the central processor commands the switching network 122 to establish a path between the assigned speech channels in the line trunk groups 108 and 158.

Once the call is set up, each of the digital line units 106 and 156 (i) converts analog signals, carried on a duplex twisted pair, to a digital signal, time division multiplexed on a line (e.g., a T1 link) between it and the line trunk group 108 or 158 and (ii) converts digital signals from its line trunk group 108 or 158 to analog signals carried on a duplex twisted pair.

Assuming that telephone B goes off-hook in response to ringing signals from tone generator 176, a voice channel between telephones A and B 102 and 104, respectively, is established via paths 190b, 199a, 198, and 199b.

§1.3 Concentration

Referring back to FIG. 1a, the digital line units 2 and 6, as well as the switch interface module(s) 12 may, inter alia, operate to concentrate traffic. To ensure that each line (See e.g., lines 4 and 8.) can always access an idle path on the switching network 20, the switching network 20 may be engineered to provide a number of paths equal to the number of lines. However, such an arrangement is usually not cost effective in the real world. Specifically, the amount of traffic handled by a switching network 20 can be measured and/or estimated. The unit hundred call seconds (or "CCS") is used when describing network traffic during peak hours. For example, "36 CCS" means that a line is being used constantly (i.e., 3600 seconds per hour) during a given time period. The switching network 20 is designed and engineered based on anticipated traffic. If the expected traffic volume is relatively low, more lines (or loops) can be serviced by fewer paths through the switch. Conversely, if the expected traffic volume is relatively high, more switching paths are needed to service the loops. In most residential areas, the central office switch is engineered for 2 CCS, in most business areas, the central office switch is engineered for 3CCS, and in urban areas, the central office switch is engineered for 4 to 6 CCS. Thus, the switching network 20 can be more highly concentrated in residential areas than urban business areas for example. Concentration may also take place at the switch interface modules 12 and digital line units 2, 6.

§1.4 Problem of Internet Usage

Internet service providers (or "ISPs") or enhanced service providers (or "ESPs") have experienced explosive growth during the mid-1990s as users desire access to the Internet and other public and private networks. This explosive growth, coupled with the typical usage patterns of the Internet, has created unique service problems for RBOCs and other telephone service providers. In many instances, users, accessing the Internet through a local Internet provider, may occupy a line, maintained by the switching network of a central office, almost continuously during certain hours. Internet service providers have typically bought small numbers of 1MB (or "1 Message Business") lines; 1MB being a tariffed service developed to handle voice traffic of about 3 CCS (or 3 hundred call seconds). Consequently, a central office having a switching network engineered for traffic expected to be 3 CCS, or even 6 CCS, must handle traffic which, in many instances, approaches 36 CCS.

It was first thought that most Internet or on-line activity would occur during early morning hours. If this were the case, such heavy "data type" usage during light traffic periods would have better utilized embedded investment in switching and transmission facilities, thereby contributing to the revenue stream of RBOCs and other telephone service providers at times when very few calls are made. Unfortunately, however, Internet traffic is heavy during the daytime. This unanticipated heavy traffic caused by high usage customers, such as Internet service providers for example, has loaded down switching networks and associated analog and digital line units at central offices of RBOCs and other telephone service providers.

RBOCs and other telephone service providers are regulated by the Public Service Commission and must meet certain minimum service level requirements. For example, ordinary telephone customers expect, and the Public Service Commission requires, that dial tone will be provided when a customer takes the handset of their telephone off-hook. However, in instances where high usage customers, such as Internet service providers, are encouraging usage of a central office switching network far in excess of its engineered capacity, service level problems (e.g., no dial tone) result.

To reiterate, in the past, the average call lasted about three minutes. However, it has been reported that the average Internet session lasts about 20 minutes. As discussed above, central offices were simply not designed and engineered to handle the increased levels of traffic caused by Internet (and other data access) users. Additional resources are required to increase the capacity of the central office to handle such traffic. Although most telephone service providers offer digital services, such as ISDN for use with ISDN compatible network termination equipment for example, for high bandwidth data communication, many Internet service providers and those accessing the Internet prefer to use less expensive high speed modems connected to lines tariffed for voice communications. Since, at this time, it is difficult for telephone service providers to determine whether a 1MB line is being used for voice (having an average use of 3CCS) or data (having an average use of 20 CCS and above), they cannot bill voice and data users at different rate. Thus, those using their telephone lines for voice communication are, in effect, subsidizing those using their telephone lines for data communication.

There is a need to prevent the use of the switching network and switch interface modules by high speed data traffic, unless such traffic has been previously authorized to use the switching network and switch interface modules.

There is also a need to permit telephone service providers to inhibit high speed data calls without inhibiting voice calls. Such a system and method should use existing equipment to the maximum extent possible.

SUMMARY OF THE INVENTION

The aforementioned problems are obviated by the invention which selectively inhibits the communication of high speed data across a communications line. The invention particularly provides a method which (a) determines whether the communications line is authorized for communication of high speed data and (b) if the communications line is not authorized for communication of high speed data, varies line conditioning applied to the communications line.

The line conditioning applied to the communications line may be varied periodically during the call, at random time(s) during the call, or at predetermined time(s) during a call. The line conditioning may be echo suppression, such as, auto hybrid balancing.

The invention also provides a device that selectively inhibits the communication of high speed data across a communications line. The device includes (a) means for providing settings to an echo suppression device; and (b) means for varying the settings.

The echo suppression device may be a digital signal processor and the settings filter coefficients. The filter coefficients may correspond to various line types. Alternatively, the settings themselves may be line types. The line types may include at least two line types, including (a) loaded loop, (b) non-loaded loop, (c) special service loop, and (d) optimized loop.

The echo suppression device may be a circuit including a selection element. In this case, the settings are control signals for controlling the selection element. The circuit may include a number of balancing circuits and, further, the selection device may select one of the balancing circuits.

The means for providing settings to an echo suppression device and the means for varying the settings may be processor-executed stored programs.

Further, the means for varying the settings may be enabled if the communications line is not authorized to carry high speed communications.

The invention also provides a subscriber line interface circuit that includes means for providing settings to an echo suppression device and means for varying the settings to manage the communication of high speed data. The echo suppression device may comprise a programmable coefficient filtering unit.

BRIEF DESCRIPTION OF THE DRAWINGS

For a better understanding of the invention, reference is made to the following description of an exemplary embodiment thereof, and to the accompanying drawings, wherein:

FIG. 4 is a high level block diagram of a system in which a method of the invention may be implemented;

DETAILED DESCRIPTION

High speed modems are used by many Internet service providers and those accessing the Internet. These modems, as discussed below, probe the line which they terminate and employ impedance balancing means to cancel echo and permit high bit rates. By changing settings for hybrid balancing (or echo suppression) at the central office, and more specifically, at a subscriber line interface, high speed modems will not be able to properly cancel echo. Consequently, such modems will be unable to operate at high bit rates.

The Internet is typically accessed via high speed modems such as those complying with one of the following ITU-T (International Telecommunication Union-Telecommunication sector) standards: (i) V.32 bis (14.4 Kbps); (ii) V.34 (28.8 Kbps); and (iii) V.34 bis (31.2 to 33.6 Kbps). V.32 compliant modems use echo canceling techniques to achieve full-duplex (i.e., two-way) transmission at 9.6 Kbps over standard two wire telephone lines. V.34 and V.34+ compliant modems automatically adapt to connection characteristics by continuously probing the channel and setting transmission parameters to maximize data rates. (See e.g., the article, Stephen Saunders, "V.34+ Modems -Minus- the Marketing Hype," Data Communications, pp. 79–89, (September 1996).)

Figure 1A:
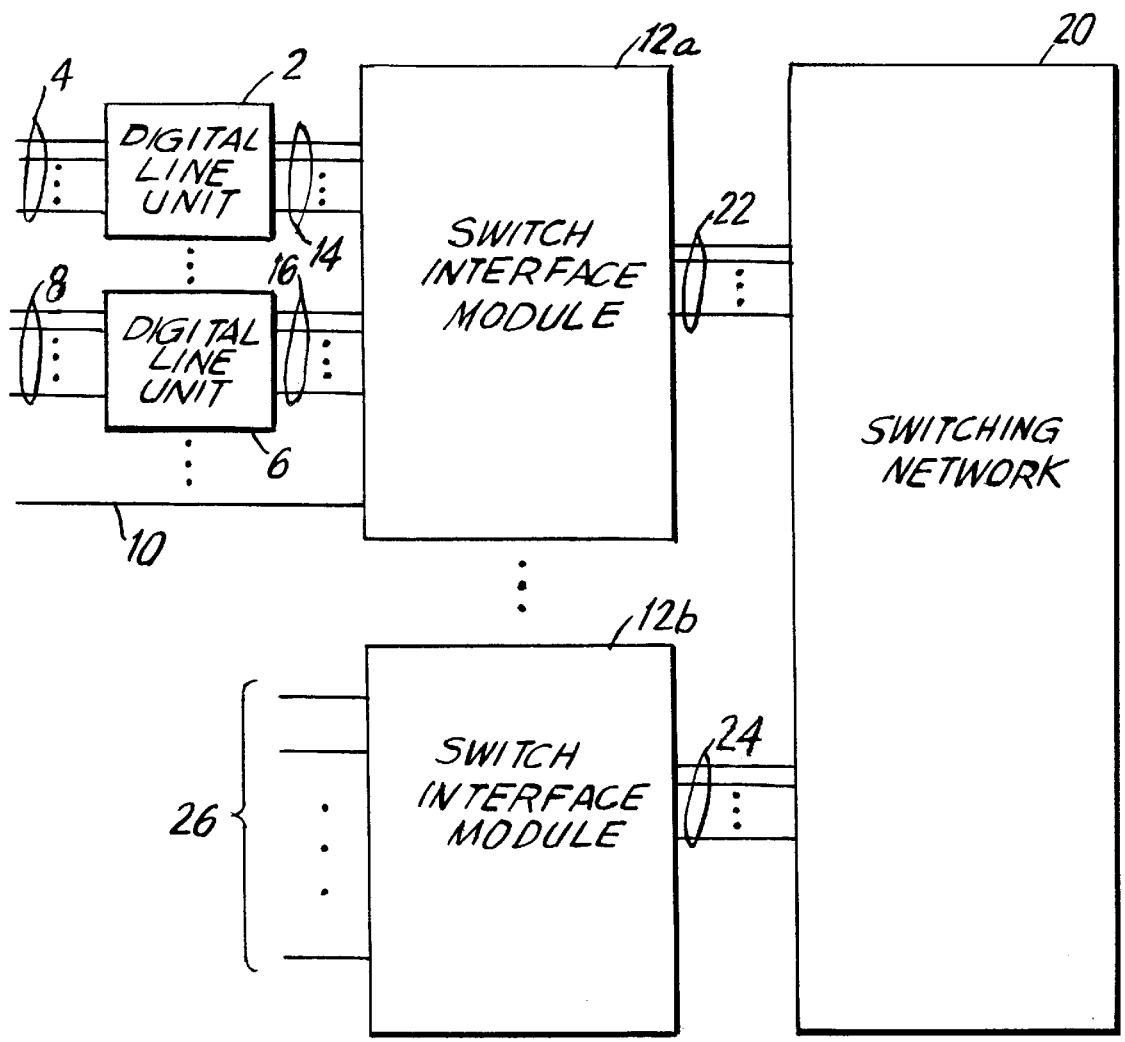
FIG. 1a is a high level block diagram of known devices used at central offices of telephone service providers.
Figure 1B:
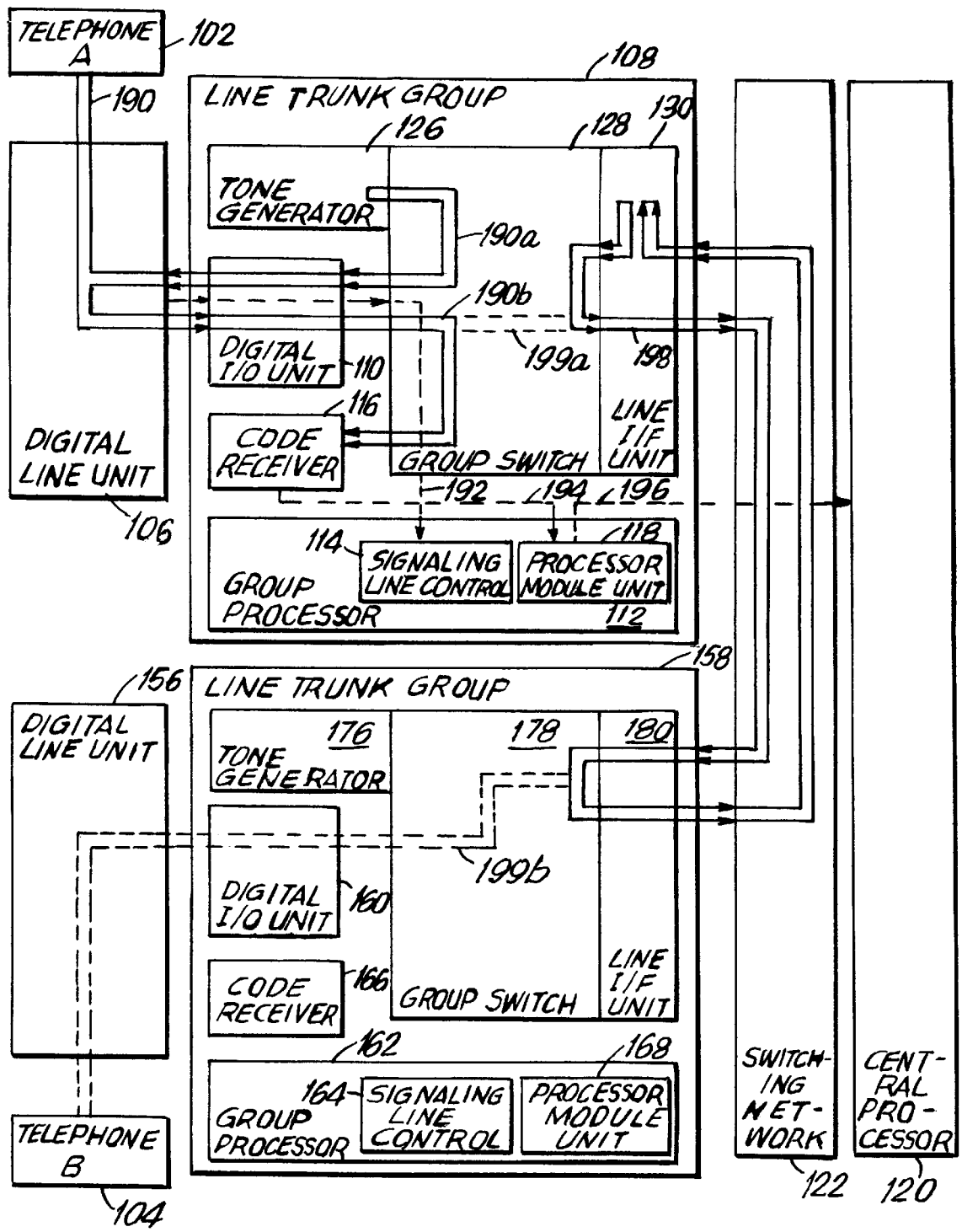
FIG. 1b is block diagram of a known switch used at central offices of telephone service providers.
Figure 2A:
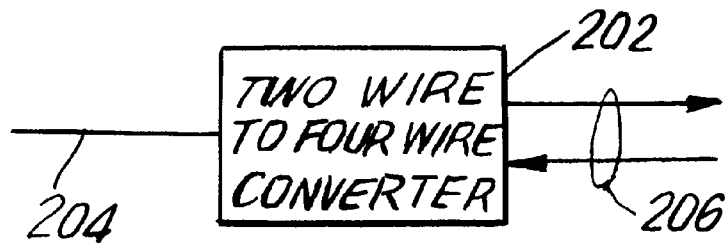
FIG. 2a is a block diagram illustrating the interface of a full duplex (i.e., bidirectional) two wire (twisted pair) path with a four wire (e.g., two unidirectional twisted pairs) path.
Figure 2B:
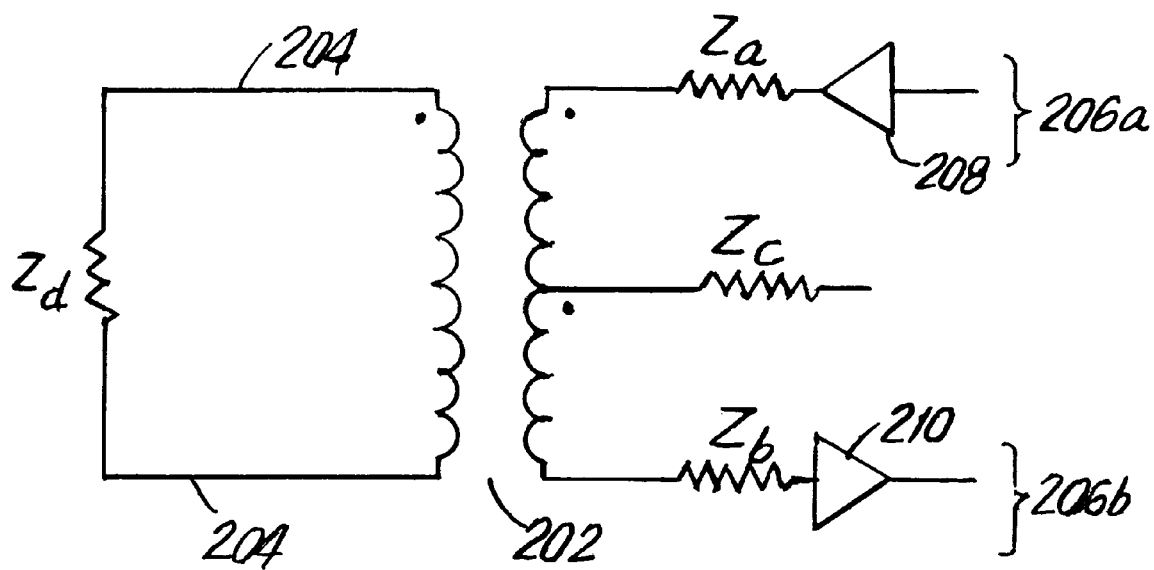
FIG. 2b is a schematic of a hybrid transformer for interfacing the bidirectional two wire path with the four wire path.
Figure 3A:
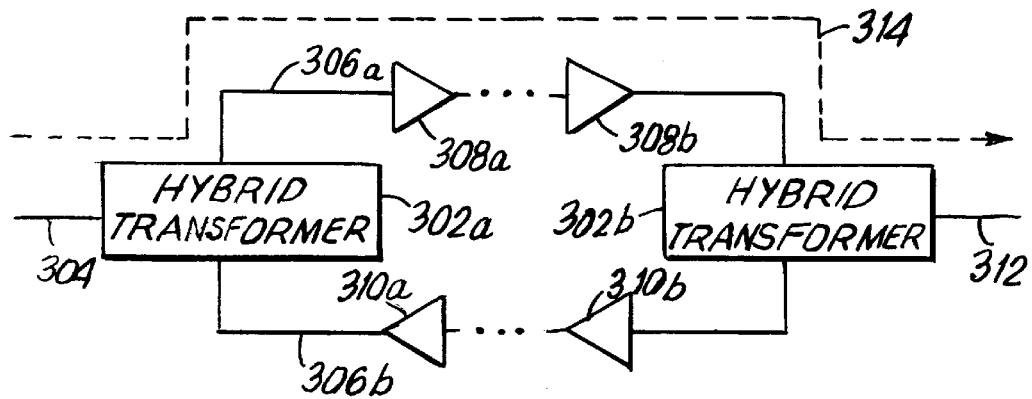
FIGS. 3a through 3c are schematics of hybrid transformer connections which illustrate the problems of "talker" echo and "listener" echo.
Figure 3B:
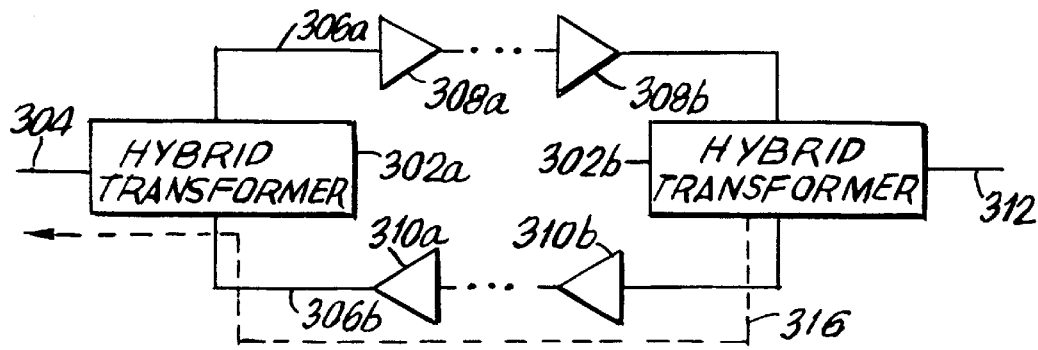
Figure 3C:
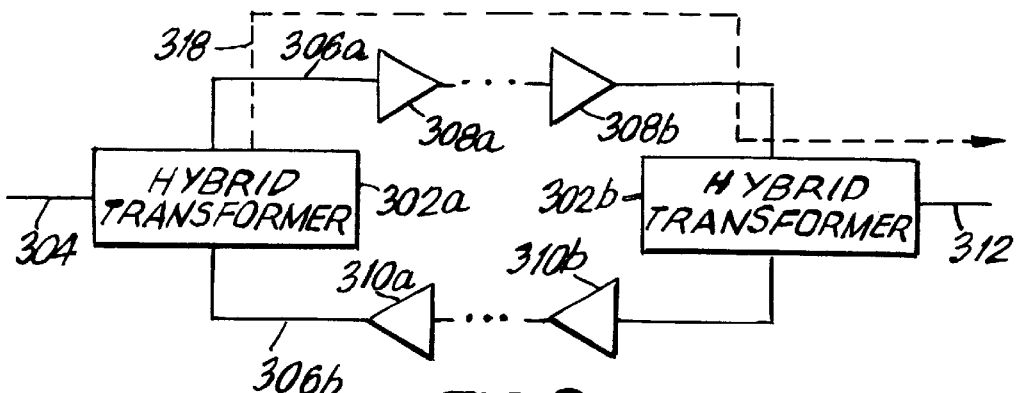
Figure 5:
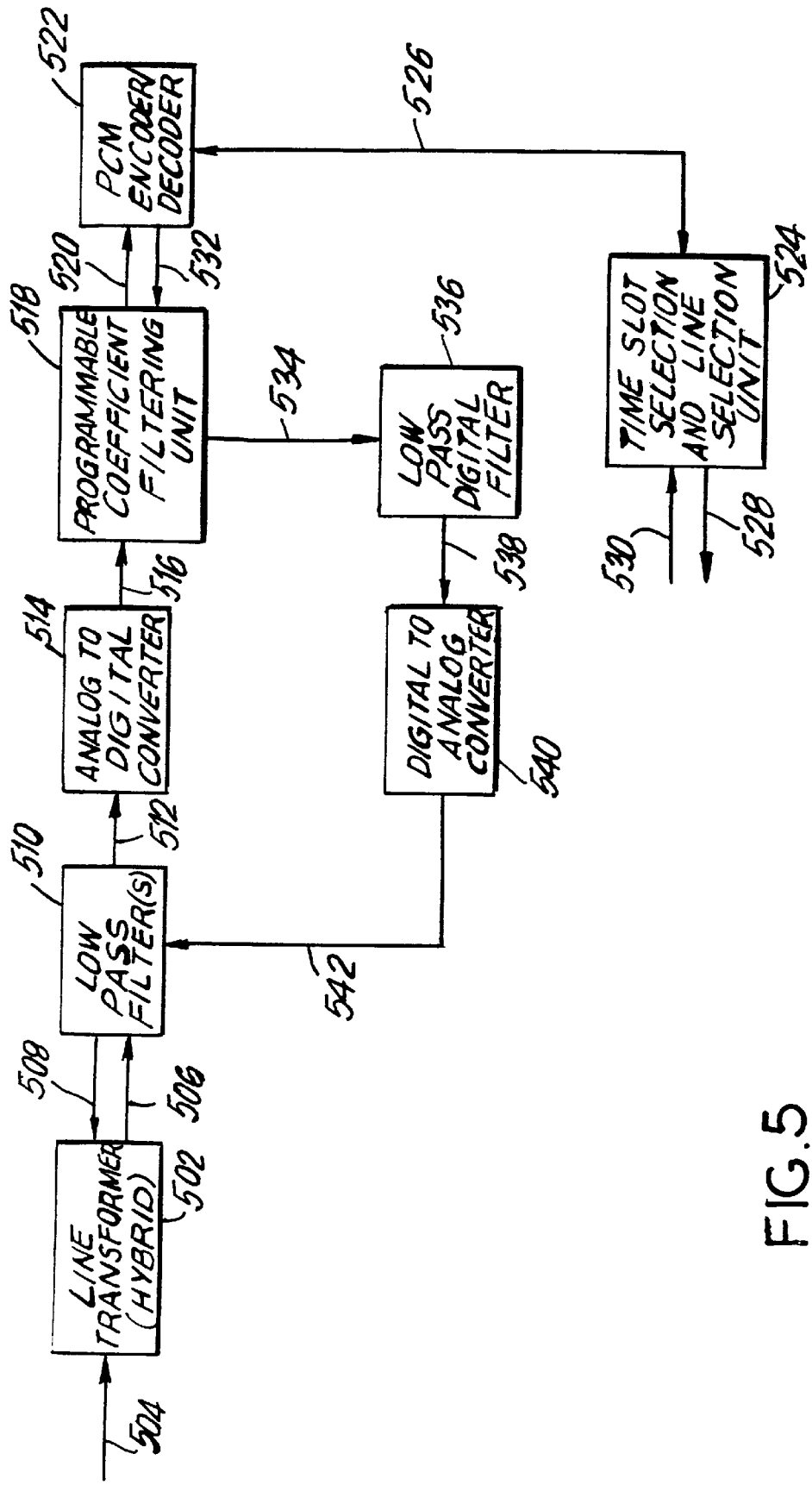
FIG. 5 is a block diagram of a subscriber line interface circuit of the invention.
Figure 6:
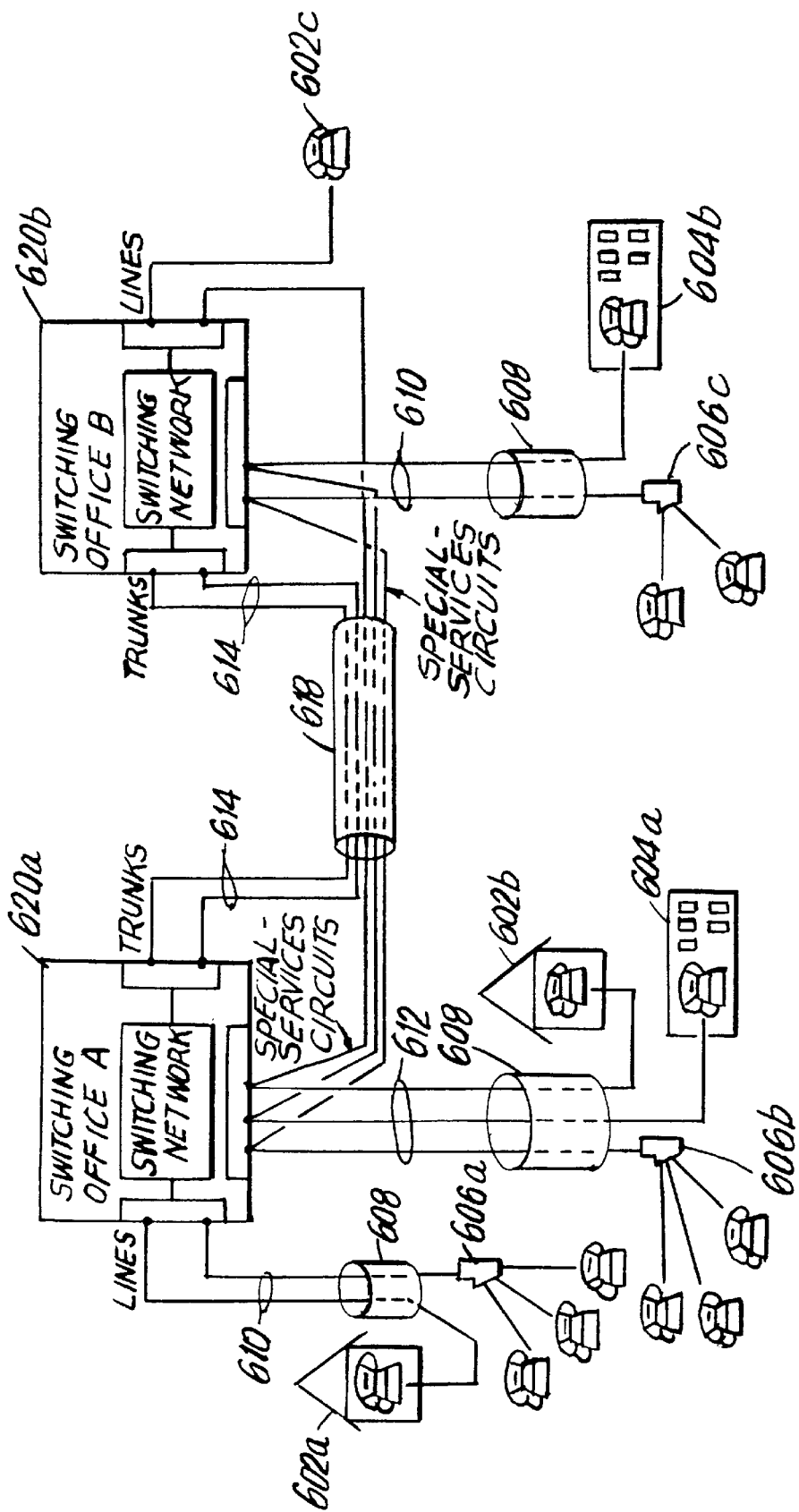
FIG. 6 is a block diagram illustrating the use of transmission facilities by various types of services.

FIG. 5 is a high level block diagram of a SLIC which may be used in a digital telecommunications switching system, such as an EWSD® switch discussed above with reference to FIG. 1b. One or more of the SLICs may include an Am79212/Am79C202 Advanced Subscriber Line Interface Chip set as sold by Siemens Stromberg-Carlson or a customer optimized subscriber line audio circuit (or "COSLAC") as sold by Siemens Stromberg-Carlson. Discussing first the signals from the line to the switch, a line transformer (or hybrid transformer) 502 converts signals on a full duplex two wire line 504 to signals on two wire unidirectional line 506. Low pass filter(s) 510 filters the signals on the unidirectional line 506. The filtered signal 512 is provided to an analog to digital converter 514 which provides a digital version 516 of the analog signal to a programmable coefficient filtering unit 518.

The programmable coefficient filtering unit 518 may be a digital signal processor and functions to, inter alia, control echo. Although the connections are not shown in FIG. 5, the controller 406 (See FIG. 4) may provide, or forward, coefficients or settings for use by the coefficient filtering unit 518. The resulting signal 520 is provided to a PCM (i.e., pulse code modulation) encoder 522 which modulates the signal and provides it, via path 526, to a time slot selection and line selection unit 524. The time slot selection and line selection unit 524 functions as a space division and time division multiplexer to place the encoded signal on a particular time slot of a particular line (See e.g., lines 14 and 16 of FIG. 1a). The encoded signal is provided, via a switch interface module (See e.g., elements 12 of FIG. 1a), to a switching network (See e.g., element 20 of FIG. 1a).

Discussing now signals from the switch to the line, the PCM decoder 522 decodes a received PCM encoded signal. The decoded signal 532 is provided to the programmable coefficient filtering unit 518 which functions, inter alia, to perform echo cancellation. The resulting signal 534 is then provided to a low pass digital filter 536. The filtered signal 538 is then converted to an analog signal by the digital to analog converter 540. The resulting analog signal 542 is then filtered again, and provided, via unidirectional wire pair 508, to the line transformer 502. The line transformer 502 converts signals on two wire unidirectional line 508 to signals on the two wire full duplex line 504.

Figure 7A:
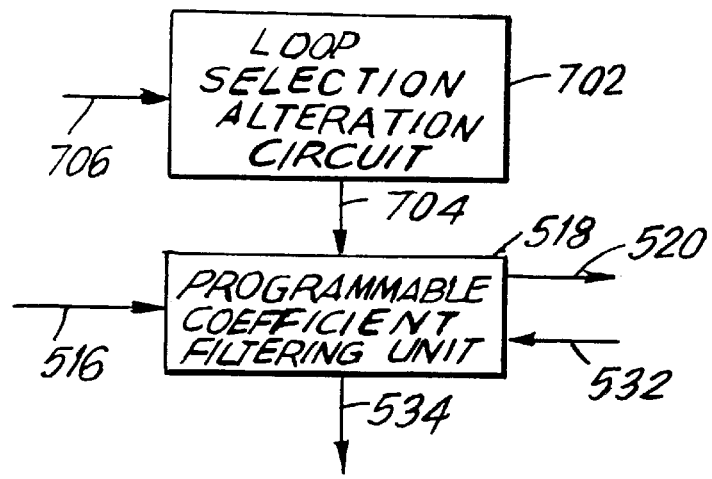
FIGS. 7a and 7b are high level block diagrams which illustrate devices of the invention which may be used with a known central office switch.
Figure 7B:
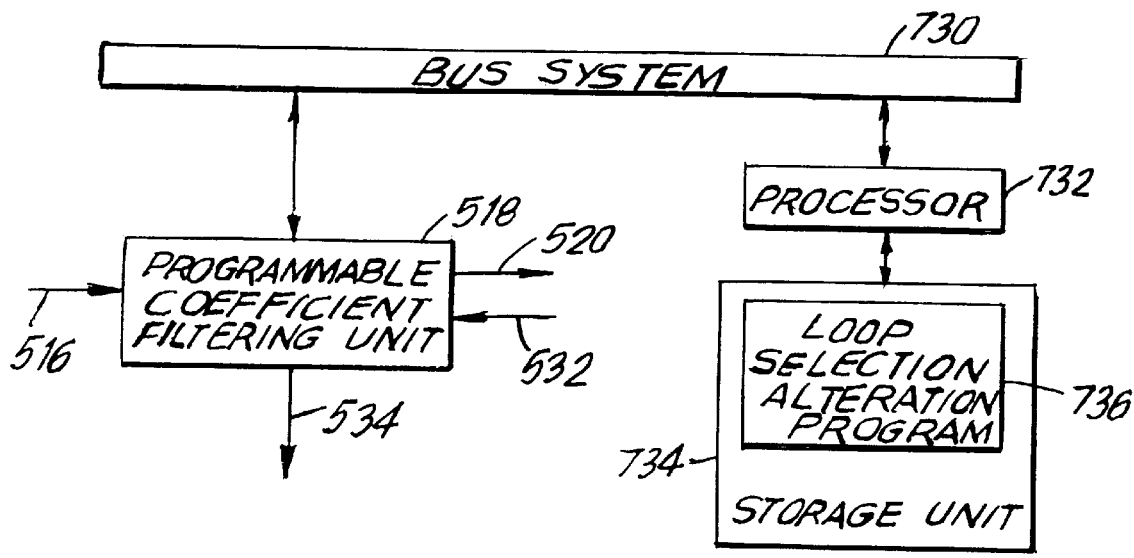

FIGS. 7a and 7b illustrate devices constructed in accordance with the invention which may be used with the digital switch. Recall that the switch provides different types of balancing networks for various types of lines (e.g., non-loaded loop, loaded loop, special service loop, optimized loop, etc.). The coefficients used by the programmable coefficient filtering unit 518 will depend on the type of line assumed to be terminated by the subscriber line interface circuit (See e.g., elements 404 of FIG. 4).

In the first device illustrated in FIG. 7a, a loop selection alteration circuit 702 provides different loop type inputs (or coefficients corresponding to different loop type inputs) 704, during a call, to the programmable coefficient filtering unit 518. By varying the assumed loop type (or coefficients corresponding to the different loop types), the balancing used for echo cancellation at the central office will vary. Thus, if a high speed modem is using the line for data transfer, the impedance matching and/or echo cancellation operations of such a high speed modem will be thrown off. This is true for both asynchronous and synchronous high speed modems. Moreover, high speed synchronous modems are typically used with link protocols which retransmit blocks when errors are detected. The throughput efficiency of such protocols is related to the modem's block error rate (i.e., the number of received blocks that contain one or more erroneous bits divided by the total number of transmitted blocks). Once a block of received data has an error, the actual number of erroneous bits is not important because the entire block must be retransmitted. However, voice communications should not be noticeably affected by the alteration of the loop type (or coefficients corresponding to the different loop types). Thus, the device reduces the possible data rate to such an extent as to render the use of voice lines for high speed data communication unacceptable while still permitting voice traffic.

An enable input 706 to the loop selection alteration circuit 702 will enable the circuit if the subscriber is paying for a voice grade line, but will disable the loop selection alteration circuit 702 if the subscriber is paying for a high speed analog data line. Telephone service providers may thus price a high speed analog data service between the price for analog voice services and digital (e.g., ISDN) services.

FIG. 7b illustrates an alternative device in which a processor 732, which normally provides a loop type, or coefficients associated with a given loop type, to the programmable coefficient filtering unit 518 via bus system 730, alters the loop type or coefficients associated with a given loop type, in accordance with a loop selection alteration program 736 stored in storage unit 734. The processor 732 may be a microprocessor and is preferably the controller (See e.g., element 406 of FIG. 4) of an analog subscriber line module (See e.g., element 402 of FIG. 4). Alternatively, the processor 732 may reside at a switch interface module (See e.g., element 112 of FIG. 1b) or may be the central processor of the central office switch (See e.g., element 120 of FIG. 1b).

In each of the above devices, the loop type, or coefficients associated with a given loop type, may be changed (a) at random time(s) throughout a call, (b) periodically throughout a call, or (c) at predetermined time(s) throughout the call.

Figure 8:
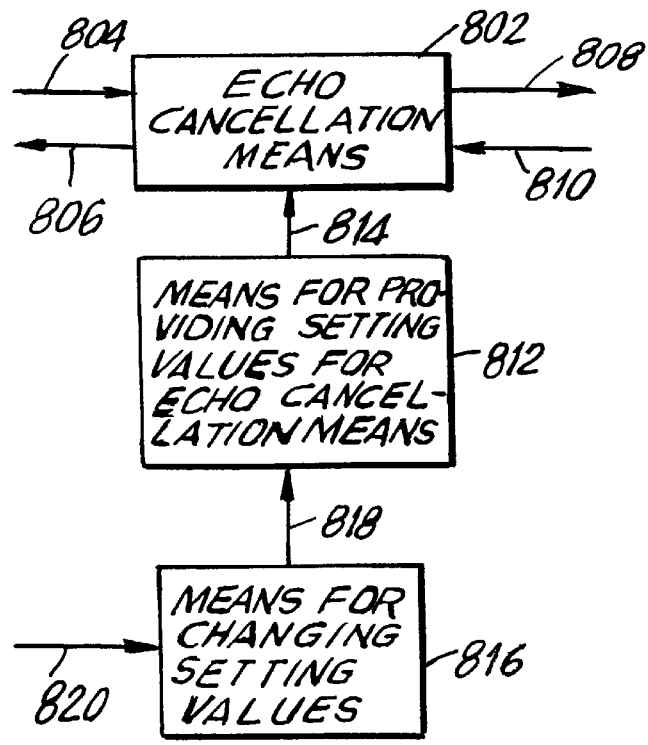
FIG. 8 is a block diagram of another device of the invention.

FIG. 8 illustrates another device constructed in accordance with the invention which may be used with any intelligent echo cancellation or auto hybrid balancing means. The echo cancellation or auto hybrid balancing means may be a part of a line conditioning means. An echo cancellation (or auto hybrid balancing) means 802 conditions signals received on its line side 804 to provide signals on its switch side 810. Similarly, the echo cancellation means 802 conditions signals received on its switch side 810 to provide signals on its line side 806. If the signals are digital, the echo cancellation means 802 may be a digital signal processor located on the switch (or four wire) side of a hybrid transformer. If the signals are analog, the echo cancellation means 802 may include a balancing network or a circuit for selecting one of a number of candidate balancing networks.

Means for providing setting values 812 provides settings to the echo cancellation means 802 via path 814. If the echo cancellation means 802 conditions digital signals, the settings may be filter coefficients, predefined line types, etc. If the echo cancellation means 802 conditions analog signals, the settings may be control values for a selection element such as a controllable switch for example. The selection element may be used to select a line balance circuit(s) from a group of line balance circuits.

Means for changing setting values 816 provides control signals to the means for providing setting values 812, via path 818. In response to control signal received from the means for changing setting values 816, the means for providing setting values 812 may (a) change an output line type, (b) change filter coefficients, or (c) change the control values of the selection element. The means for changing setting values 816 may be enabled or disabled based on a control signal(s) provided on line 820. Once enabled, the means for changing setting values 816 may provide control signals (a) at random time(s) throughout a call, (b) periodically throughout a call, or (c) at predetermined time(s) throughout the call. Alternatively, the means for changing setting values 816 may provide control signals only when enabled.

The means for providing setting values for echo cancellation means 812 and the means for changing setting values 816 may be implemented as processor-executed instructions. (See e.g., FIG. 7b) In this case, a storage unit would include instructions for providing setting values and instructions for changing those setting values. The processor (not shown) may be a microprocessor and is preferably the controller (See e.g., element 406 of FIG. 4) of an analog subscriber line module (See e.g., element 402 of FIG. 4). Alternatively, the processor may reside at a switch interface module (See e.g., element 112 of FIG. 1b) or may be the central processor of the central office switch (See e.g., element 120 of FIG. 1b).

Figure 9:
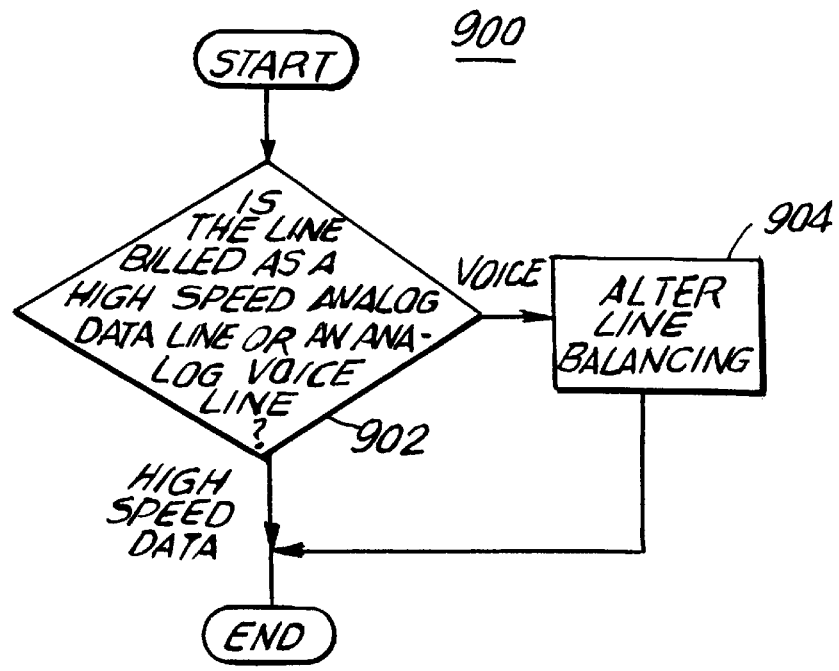
FIG. 9 is flow diagram of a method of the invention.

FIG. 9 is a flow diagram illustrating a method 900 carried out in accordance with the invention. First, as shown in step 902, it is determined whether the line at issue is billed as a high speed analog data line or an analog voice (or low speed analog data) line. This can be determined based on a database at the switch. Alternatively, each subscriber line interface circuit (See e.g., elements 404 of FIG. 4) may include registers or other storage means which hold information which indicates how the line is being billed. These settings may be reset, via a subscriber line controller (See e.g., element 406 of FIG. 4), a processor at the switch module interface (See e.g., element 112 of FIG. 1b) or a central processor of the central office (See e.g., element 120 of FIG. 1b).

If the line is billed as a high speed analog data line, no special processing is performed. This will permit the effective use of echo canceling techniques by high speed modems (e.g., V.32 bis, V.34 and V.34 bis compliant modems) because the impedance balancing and/or filtering at the central office will be fixed.

If, on the other hand, the line is billed as an analog voice (or low speed analog data) line, as shown in step 904, the line balancing (e.g., the impedance balancing and/or filtering) at the central office is altered. Such alteration is performed, for example, by enabling a loop selection alteration circuit (See e.g., FIG. 7a), by executing a loop selection alteration program (See e.g., FIG. 7b) or by enabling means for changing setting values provided to an echo cancellation means (See e.g., FIG. 8). Consequently, if a high speed modem is using the line for data transfer, the impedance matching and/or echo cancellation operations of such a high speed modem will be thrown off. To reiterate, high speed synchronous modems are typically used with link protocols which retransmit blocks when errors are detected. The throughput efficiency of such protocols is related to the modem's block error rate (i.e., the number of received blocks that contain one or more erroneous bits divided by the total number of transmitted blocks). Once a block of received data has an error, the actual number of erroneous bits is not important because the entire block must be retransmitted. However, voice communications should not be noticeably affected.

Thus, the method and devices of the invention, reduce the possible data rate to such an extent to render the use of voice lines for high speed data communication unacceptable while still permitting voice (and low speed data) traffic. This will enable telephone service providers to more closely tailor their billing to the costs of providing various services. In this way, subscribers of analog voice lines will not have to subsidize Internet users, Internet service providers, and others who use their analog voice line for high speed data communication.

The embodiments described herein are merely illustrative of the principles of the present invention. Various modifications may be made thereto by persons ordinarily skilled in the art, without departing from the scope or spirit of the invention.

What is claimed is:

1. A method for maximizing the capacity of a communication line by selectively inhibiting the communication of high speed data across the communications line, comprising steps of:
   a) determining whether the communications line is authorized for communication of high speed data; and
   b) if the communications line is not authorized for communication of high speed data, varying line conditioning applied to the communications line to inhibit such communication.

2. The method of claim 1, wherein the step of varying line conditioning applied to the communications line is performed periodically during a communications call.

3. The method of claim 1, wherein the step of varying line conditioning applied to the communications line is performed randomly during a communications call.

4. The method of claim 1, wherein the step of varying line conditioning applied to the communications line is performed at predetermined times during a communications call.

5. The method of claim 1, wherein the step of varying line conditioning comprises the step of applying echo suppression.

6. The method of claim 1, wherein the step of varying line conditioning comprises the step of applying auto hybrid balancing.

7. A device for maximizing the capacity of a communications line selectively authorized for communication of high speed data by selectively inhibiting the communication of high speed data across the communications line, comprising:
   a) means for providing settings to an echo suppression device; and
   b) means for varying the settings to inhibit the communication of high speed data if the line is not authorized for such communication.

8. The device of claim 7, wherein the echo suppression device comprises a digital signal processor and the settings comprise filter coefficients.

9. The device of claim 8, wherein the filter coefficients correspond to various line types.

10. The device of claim 7, wherein the echo suppression device comprises a digital signal processor and the settings comprise line types.

11. The device of claim 10, wherein the line types comprise at least two line types selected from the group of line types consisting of loaded loop, non-loaded loop, special service loop, and optimized loop.

12. The device of claim 7, wherein the echo suppression device comprises a circuit including a selection element and wherein the settings comprise control signals for controlling the selection element.

13. The device of claim 12, wherein the circuit includes a number of balancing circuits.

14. The device of claim 13, wherein the selection element selects one of the number of balancing circuits.

15. The device of claim 7, wherein the means for providing settings to an echo suppression device and the means for varying the settings comprise processor-executed stored computer programs.

16. The device of claim 7, wherein the means for varying the settings is enabled if the communications line is not authorized to carry high speed communications.

17. A subscriber line interface circuit for a subscriber line selectively authorized for communication of high speed data, comprising:
   a) means for providing settings to an echo suppression device, and
   b) means for varying the settings to selectively inhibit the communication of high speed data if the subscriber line is not authorized for such communication.

18. The circuit of claim 17, wherein the echo suppression device comprises a programmable coefficient filtering unit.

* * * * *